United States Patent
Holz

(10) Patent No.: US 9,392,196 B2
(45) Date of Patent: Jul. 12, 2016

(54) OBJECT DETECTION AND TRACKING WITH REDUCED ERROR DUE TO BACKGROUND ILLUMINATION

(71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 286 days.

(21) Appl. No.: 14/075,927

(22) Filed: Nov. 8, 2013

(65) Prior Publication Data

US 2014/0125815 A1 May 8, 2014

Related U.S. Application Data

(60) Provisional application No. 61/724,076, filed on Nov. 8, 2012.

(51) Int. Cl.
*H04N 5/217* (2011.01)
*H04N 5/235* (2006.01)
*H04N 5/345* (2011.01)
*H04N 5/355* (2011.01)

(52) U.S. Cl.
CPC ........... *H04N 5/35572* (2013.01); *H04N 5/217* (2013.01); *H04N 5/2354* (2013.01); *H04N 5/3452* (2013.01)

(58) Field of Classification Search
None
See application file for complete search history.

(56) References Cited

U.S. PATENT DOCUMENTS

| | | | | |
|---|---|---|---|---|
| 4,371,894 A * | 2/1983 | Camras | ................ | G11B 7/0037 369/111 |
| 6,507,365 B1 * | 1/2003 | Nakamura | ........... | H04N 3/1556 348/296 |
| 7,495,646 B2 * | 2/2009 | Kawabe | ................. | G09G 3/342 345/95 |
| 2001/0036359 A1 * | 11/2001 | Nishikawa | ......... | H04N 5/23293 386/227 |
| 2004/0041927 A1 * | 3/2004 | Cho | ....................... | H04N 3/155 348/254 |
| 2006/0098248 A1 * | 5/2006 | Suzuki | ............... | H04N 1/00002 358/496 |
| 2006/0184037 A1 * | 8/2006 | Ince | ....................... | A61B 1/042 600/476 |
| 2007/0285529 A1 * | 12/2007 | Imamura | ................ | H04N 9/045 348/222.1 |
| 2008/0055436 A1 * | 3/2008 | Sarwari | .................. | H04N 9/045 348/272 |
| 2012/0177352 A1 * | 7/2012 | Pillman | ................ | H04N 5/2354 396/61 |

* cited by examiner

*Primary Examiner* — Jay Patel
*Assistant Examiner* — Reza Aghevli
(74) *Attorney, Agent, or Firm* — Haynes Beffel & Wolfeld LLP; Ernest J. Beffel, Jr.

(57) ABSTRACT

An image sensor frame rate can be increased by "interlaced" mode operation whereby only half the number of lines of an image is transported to the readout circuitry. This halves the integration time but also halves the resolution of the sensor. Accordingly, in one embodiment, an image sensor operated in an interlaced fashion is first exposed to a scene under a first form of illumination (e.g., narrowband illumination), and a first set of alternating (horizontal or vertical) lines constituting half of the pixels is read out of the array; the sensor is then exposed to the same scene under a second form of illumination (e.g., existing ambient illumination with the illumination source turned off), and a second set of alternating lines, representing the other half of the pixel array, is read out. The two images are compared and noise removed from the image obtained under narrowband illumination.

14 Claims, 3 Drawing Sheets

OBJECT DETECTION AND TRACKING WITH REDUCED ERROR DUE TO BACKGROUND ILLUMINATION

PRIORITY

This application claims the benefit of U.S. Provisional Patent Application No. 61/724,076, by the same title and inventors, filed 8 Nov. 2012, which is incorporated herein by reference.

TECHNOLOGY FIELD

The technology disclosed generally relates to imaging systems and in particular to three-dimensional (3D) object detection, tracking and characterization using optical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Motion-capture systems are used in a variety of contexts to obtain information about the conformation and motion of various objects, including objects with articulating members, such as human hands or human bodies. Such systems generally include cameras to capture sequential images of an object in motion and computers to analyze the images to create a reconstruction of an object's volume, position and motion. For 3D motion capture, at least two cameras are typically used.

Image based motion capture systems rely on the ability to distinguish an object of interest from other objects or background. This is often achieved using image-analysis algorithms that detect edges, typically by comparing pixels to detect abrupt changes in color and/or brightness. Such conventional systems, however, suffer performance degradation under many common circumstances, e.g., low contrast between the object of interest and the background and/or patterns in the background that may falsely register as object edges. This may result, for example, from reflectance similarities—that is, under general illumination conditions, the chromatic reflectance of the object of interest is so similar to that of surrounding or background objects that it cannot easily be isolated.

Optical filters may be used to enhance object discrimination. In a typical setup, a source light illuminates the object(s) of interest, and motion of the object(s) is detected and tracked based on reflected source light, which is sensed by one or more cameras directed at the scene. Most simply, narrowband source light can be used with corresponding band-pass filters in front of the cameras; in this way, the cameras "see" only the source light and not light from general illumination.

The reliability of this approach can degrade in various situations, e.g., when surrounding or background objects are close to the objects of interest. In such circumstances, the signal-to-noise ratio for discrimination diminishes to the point of inability to reliably distinguish foreground from background. One approach to mitigating this degradation is to capture separate successive images, one under general illumination and the other, obtained immediately thereafter, under illumination from a narrowband source light. The differently illuminated images may be compared and the general-illumination image used to remove noise from the narrowband-illumination image. This may be accomplished, for example, using the ratio between the two images (i.e., taking the pixel-by-pixel amplitude ratios and eliminating, from the narrowband image, pixels whose ratio falls below a threshold).

A limitation of this approach is latency resulting from the need to obtain and process two successive image frames. Conventional image sensors include complementary metal-oxide semiconductor (CMOS) devices and charge-coupled devices (CCDs). Both types of image sensor typically include an array of photosensitive elements (pixels) that collect charge carriers in response to illumination. In a CCD, the charge is actually transported across the chip and read at one corner of the array, where it is converted to a voltage from which an image may be reconstructed by associated circuitry. The time required to move the charge from the pixels represents the exposure time (also called the integration time) of the CCD; after this time has elapsed the CCD is ready to receive a new image, even if the displaced charges are still being processed by the readout circuitry. The integration time is a key source of latency in image-acquisition and processing systems, and in a system designed to detect and characterize motion, this delay can be particularly problematic since components of the captured scene will have shifted from frame to frame. The objective of removing noise from an image may be undermined by the additional noise introduced by this shift.

An opportunity arises to address background noise with reduced latency.

SUMMARY

An image sensor frame rate can be increased by "interlaced" mode operation whereby only half the number of lines (alternating between odd and even lines) of an image is transported to the readout circuitry. This halves the integration time but also halves the resolution of the sensor. The reduction is tolerable for motion characterization as long as sufficient image resolution remains. Accordingly, in one embodiment, an image sensor operated in an interlaced fashion is first exposed to a scene under a first form of illumination (e.g., narrowband illumination), and a first set of alternating (horizontal or vertical) lines constituting half of the pixels is read out of the array; the sensor is then exposed to the same scene under a second form of illumination (e.g., existing ambient illumination with the narrowband source turned off), and a second set of alternating lines, representing the other half of the pixel array, is read out. The two images are compared and noise removed from the image obtained under narrowband illumination. As this occurs, the image sensor is capturing the next image under the first form of illumination, and the process continues. So long as image comparison and processing occurs quickly enough, the readout rate will remain the rate-limiting factor in overall operation.

Interlaced operation can be achieved in different ways. In one implementation, all pixels receive and respond to light, but only one set of alternating lines is read out. After readout is complete, the sensor is exposed again to the same scene under the other form of illumination and the other set of alternating lines is read out. In a second implementation, the sensor is controlled such that only one set of lines is active during each exposure, for example, the other set of lines may be clamped at a voltage that prevents charge accumulation at the pixels. After readout, the just-exposed pixels are inactivated and the other set of lines freed to respond to light.

One advantage to this approach is that adjacent rows can be compared on a sequential basis so that, for example, a noise level can be computed and applied to one of the images (generally the narrowband image) before all rows have been analyzed. This substantially increases throughput.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Figure 1:
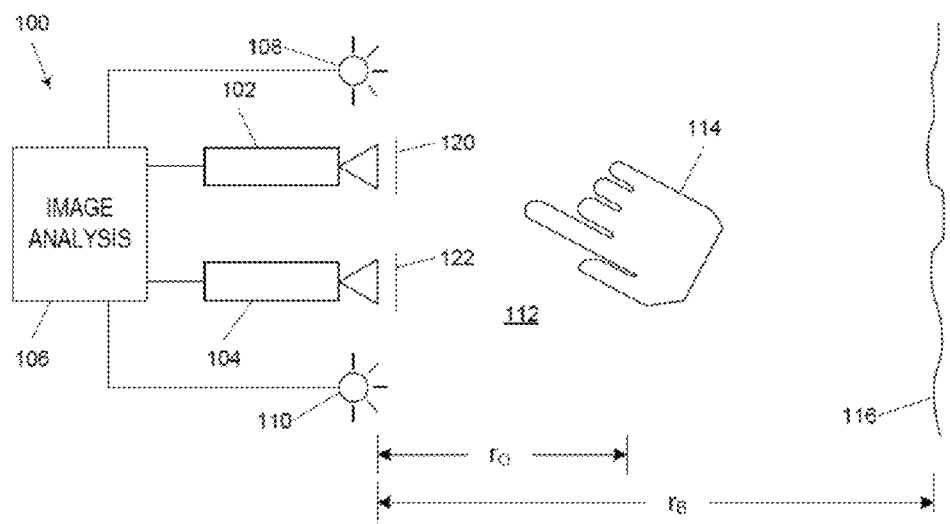
FIG. 1 illustrates a representative system for capturing image data.

FIG. 1 illustrates a system 100 for capturing image data. System 100 including a pair of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband—i.e., monochromatic radiation having a single wavelength or radiation limited to a narrow band of wavelengths (e.g., no more than 10 nm to each side of a peak wavelength).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

The illustrated system 100 includes a pair of light sources 108, 110, which can be disposed to either side of cameras 102, 104, and controlled by image-analysis system 106. Light sources 108, 110 can be infrared or other narrowband light sources of generally conventional design, e.g., infrared light emitting diodes (LEDs), and cameras 102, 104 can be sensitive to the narrowband (and visible) light. A pair of filters 120, 122 can be placed in front of cameras 102, 104 to filter out visible light so that only infrared light is registered in the images captured by cameras 102, 104, but the operation of the technology disclosed makes these optional. In some embodiments where the object of interest is a person's hand or body, use of infrared or other narrowband light can allow the motion capture system to operate under a broad range of lighting conditions and can avoid various inconveniences or distractions that may be associated with directing visible light into the region where the person is moving.

It should be stressed that the arrangement shown in FIG. 1 is representative and not limiting. For example, lasers or other light sources can be used instead of LEDs. For laser setups, additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, cameras 102, 104 are oriented toward a region of interest 112 in which an object of interest 114 (in this example, a hand) and one or more background objects 116 can be present. Light sources 108, 110 are arranged to illuminate region 112. In some embodiments, one or more of the light sources 108, 110 and one or more of the cameras 102, 104 are disposed below the motion to be detected, e.g., where hand motion is to be detected, beneath the spatial region where that motion takes place. This is an optimal location because the amount of information recorded about the hand is proportional to the number of pixels it occupies in the camera images, the hand will occupy more pixels when the camera's angle with respect to the hand's "pointing direction" is as close to perpendicular as possible. Because it is uncomfortable for a user to orient his palm toward a screen, the optimal positions are either from the bottom looking up, from the top looking down (which requires a bridge) or from the screen bezel looking diagonally up or diagonally down. In scenarios looking up there is less likelihood of confusion with background objects (clutter on the user's desk, for example) and if it is directly looking up then there is little likelihood of confusion with other people out of the field of view (and also privacy is enhanced by not imaging faces). Image-analysis system 106, which can be, e.g., a computer system, can control the operation of light sources 108, 110 and cameras 102, 104 to capture images of region 112. Based on the captured images, image-analysis system 106 determines the position and/or motion of object 114.

For example, as a step in determining the position of object 114, image-analysis system 106 can determine which pixels of various images captured by cameras 102, 104 contain portions of object 114. In some embodiments, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance (rO) between an object of interest 114 and cameras 102, 104 is expected to be smaller than the distance (rB) between background object(s) 116 and cameras 102, 104. Because the intensity of light from sources 108, 110 decreases as 1/r2, object 114 will be more brightly lit than background 116, and pixels containing portions of object 114 (i.e., object pixels) will be correspondingly brighter than pixels containing portions of background 116 (i.e., background pixels). For example, if rB/rO=2, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These assumptions generally hold for suitable choices of cameras 102, 104, light sources 108, 110, filters 120, 122, and objects commonly encountered. For example, light sources 108, 110 can be narrowband LEDs, and filters 120, 122 can be matched to the frequency band of light sources 108, 110. Thus, although a human hand or body, or a heat source or other object in the background, may emit some infrared radiation, the response of cameras 102, 104 can still be dominated, with noise, by light originating from sources 108, 110 and reflected by object 114 and/or background 116. The technology disclosed is directed to removing this noise.

Figure 2:
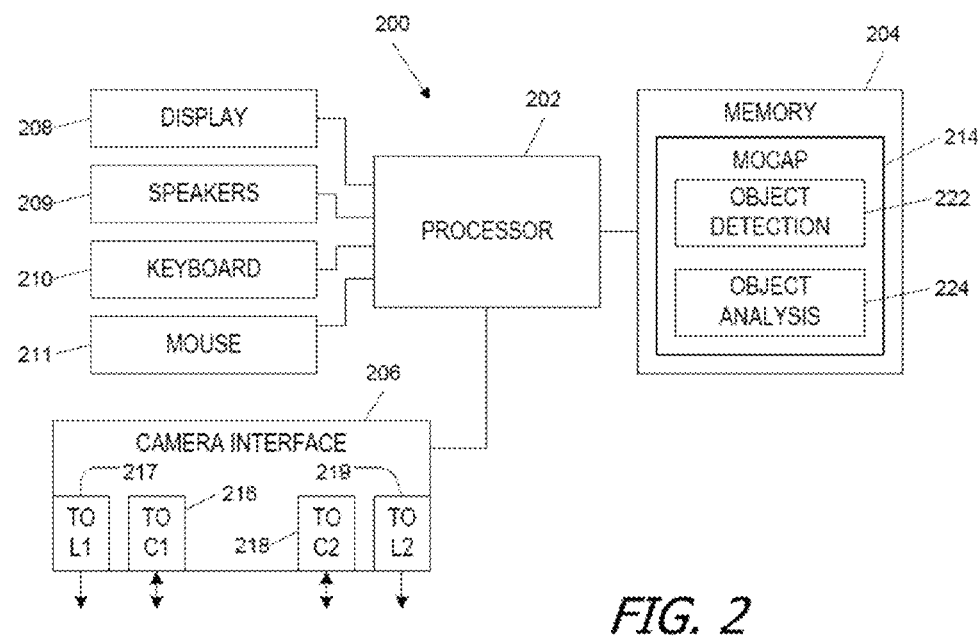
FIG. 2 is a simplified block diagram of a computer system implementing an image analysis apparatus.

Image-analysis system 106 (also referred to as an image analyzer) can include or consist of any device or device component that is capable of capturing and processing image data, e.g., using techniques described herein. FIG. 2 is a simplified block diagram of a computer system 200 implementing image-analysis system 106. Computer system 200 includes a processor 202, a memory 204, a camera interface 206, a display 208, speakers 209, a keyboard 210, and a mouse 211.

Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the technology disclosed.

Camera interface 206 can include hardware and/or software that enables communication between computer system 200 and cameras such as cameras 102, 104 shown in FIG. 1, as well as associated light sources such as light sources 108, 110 of FIG. 1. Thus, for example, camera interface 206 can include one or more data ports 216, 218 to which cameras can be connected, as well as hardware and/or software signal processors to modify data signals received from the cameras (e.g., to reduce noise or reformat data) prior to providing the signals as inputs to a conventional motion-capture ("mocap") program 214 executing on processor 202. In some embodiments, camera interface 206 can also transmit signals to the cameras, e.g., to activate or deactivate the cameras, to control camera settings (frame rate, image quality, sensitivity, etc.), or the like. Such signals can be transmitted, e.g., in response to control signals from processor 202, which may in turn be generated in response to user input or other detected events.

Camera interface 206 can also include controllers 217, 219, to which light sources (e.g., light sources 108, 110) can be connected. In some embodiments, controllers 217, 219 supply operating current to the light sources, e.g., in response to instructions from processor 202 executing mocap program 214. In other embodiments, the light sources can draw operating current from an external power supply (not shown), and controllers 217, 219 can generate control signals for the light sources, e.g., instructing the light sources to be turned on or off or changing the brightness. In some embodiments, a single controller can be used to control multiple light sources.

Instructions defining mocap program 214 are stored in memory 204, and these instructions, when executed, perform motion-capture analysis on images supplied from cameras connected to camera interface 206. In one embodiment, mocap program 214 includes various modules, such as an object detection module 222 and an object analysis module 224; again, both of these modules are conventional and well-characterized in the art. Object detection module 222 can analyze images (e.g., images captured via camera interface 206) to detect edges of an object therein and/or other information about the object's location. Object analysis module 224 can analyze the object information provided by object detection module 222 to determine the 3D position and/or motion of the object. Examples of operations that can be implemented in code modules of mocap program 214 are described below. Memory 204 can also include other information and/or code modules used by mocap program 214.

Display 208, speakers 209, keyboard 210, and mouse 211 can be used to facilitate user interaction with computer system 200. These components can be of generally conventional design or modified as desired to provide any type of user interaction. In some embodiments, results of motion capture using camera interface 206 and mocap program 214 can be interpreted as user input. For example, a user can perform hand gestures that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, an image analyzer can be implemented using only a subset of computer system components (e.g., as a processor executing program code, an ASIC, or a fixed function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

In accordance with the technology disclosed, the image sensors of cameras 102, 104 are operated to reduce noise arising from, for example, background general illumination present in the region of interest 112. A representative image sensor 300 includes an array of pixels organized, for control purposes, into two sets 310, 312 of alternating columns. Although only four pixel columns are illustrated, a typical sensor will contain many columns; moreover, pixels may be controlled in rows rather than columns.

Figure 3:
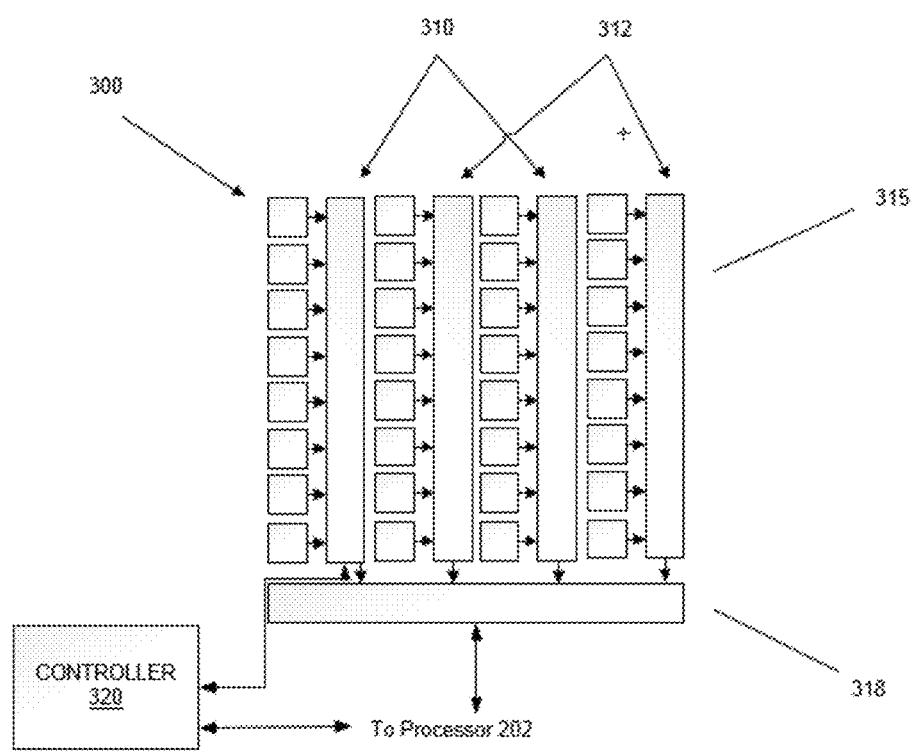
FIG. 3 is a block diagram of an image sensor.

The illustrated sensor 300 is an "interline" CCD sensor in which columns 310, 312 are separated by columnar light-shielded registers, one of which is representatively indicated at 315. At the end of the integration period, all of the photosensitive elements simultaneously transfer their accumulated charge to the adjacent storage register 315. The registers 315 then transfer the charge to a readout register 318, during which time the charge-transferring photosensitive elements can begin capturing the next image. A controller 320 controls the operation of sensor 300 so that the sets of lines 310, 312 operate sequentially in an interlaced fashion. Moreover, and with reference to FIGS. 1-3, controller 320 is in operative communication with processor 202 (see FIG. 2), which controls light sources 108, 110 via controllers 217, 219. These elements cooperate such that during a first interval, narrowband lights 108, 110 are active and a first set of pixels (e.g., columns 310) records an active image by generating charge in response to incident light and transferring the charge to associated storage registers 315. The contents of storage registers 315 are received by readout register 318 for transfer to image-analysis system 106. During a second interval as these transfers occur, controllers 217, 219 deactivate light sources 108, 110 and the second set of pixels (e.g., columns 312) records a background image by generating charge in response to incident light and transferring the charge to associated storage registers 315, which by now are empty and ready to receive the charges. Image-analysis system 106 compares the two images and removes noise from the active image obtained under narrowband illumination. As this occurs, the image sensor 300 is capturing the next image under narrowband light, and the cycle repeats. So long as image comparison and processing occurs quickly enough, the readout rate will remain the rate-limiting factor in overall operation.

Noise removal may occur in any conventional fashion, e.g., by subtraction from or thresholding against the background image, or using the ratio between the two images (i.e., taking the pixel-by-pixel amplitude ratios and eliminating, from the narrowband image, pixels whose ratio falls below a threshold).

Interlaced operation can be achieved in different ways. In one implementation, all pixels receive and respond to light, but only one set of lines 310, 312 is read out. Thus, during the first interval, the scene is recorded by all pixels with lights 108, 110 on or off (let us assume off for purposes of example), but only lines 310 are read out and transferred to image-analysis system 106. During the second interval, the scene is recorded by all pixels with lights 108, 110 on, and only lines 312 are read out and transferred to image-analysis system 106. In a second implementation, controller 320 controls the sensor 300 such that only one set of pixel lines 310, 312 is active during each exposure—for example, controller 320 may clamp the other set of pixels at a voltage that prevents charge accumulation thereon. After readout, controller 320 inactivates the just-exposed pixels in the same fashion and frees the other set of lines (e.g., by removing the clamping voltage) to respond to light.

The operations described above can be varied depending on the application and environment. For example, interlacing between active and background images need not occur in an alternating fashion; that is, if the overall noise level is not changing very much, it is possible to delay obtaining a background image until more than one active image has been taken—e.g., after every second, third, fifth, or other number of active images. This number (i.e., the ratio of active to background images) can vary dynamically depending on the level of noise and/or the rate at which it changes.

Furthermore, the technology disclosed is not limited to any particular type of image sensor. Indeed, the interline configuration illustrated in FIG. 3, while common, has disadvantages. Because the storage registers are located within the pixel array, they occupy "real estate" that could otherwise support additional pixels; a large proportion (typically 40%) of the imaging area, therefore, is not sensitive to light. In a "full frame" architecture, pixels occupy the entire imaging area and the image is transferred directly to the readout register. Only a single line at a time can be transferred, however, and as this occurs, pixels that have not yet been read out of the array can record new image information—that is, pixel contents continually change until they are read out. The problem with this, of course, is that image information in the unread pixels is fresher than the information that has been read out, and this can lead to smearing and blurring of the final image. One way to address this problem is to use a mechanical shutter that prevents light from overwriting pixel contents until the entire array has been read out. This may limit throughput to such an extent as to make a full-frame sensor impractical, however. In accordance with the present approach, however, the lights 108, 110 can be activated and deactivated for minuscule time periods each corresponding to the (very short) time necessary to read out a line of pixels. In this way, a few adjacent lines obtained, respectively, under ambient and narrowband illumination can be compared on a sequential basis so that, for example, a noise level can be computed based on these few lines before the remaining pixels are read out. Pixel readout may involve reading out the entire remainder of the array (e.g., by closing a shutter over the array until readout is complete), but more preferably image-analysis module 106 is configured to accommodate changes in the pixel information over the readout time. Since the image is not captured for aesthetic value, shifts that cause blurring are relevant only insofar as they impair the ability to detect and characterize motion. In fact, knowledge of the readout rate can be employed computationally to assist, rather than detract from, motion detection and characterization by identifying edge pixels and tracking their shifts during readout.

Figure 4:
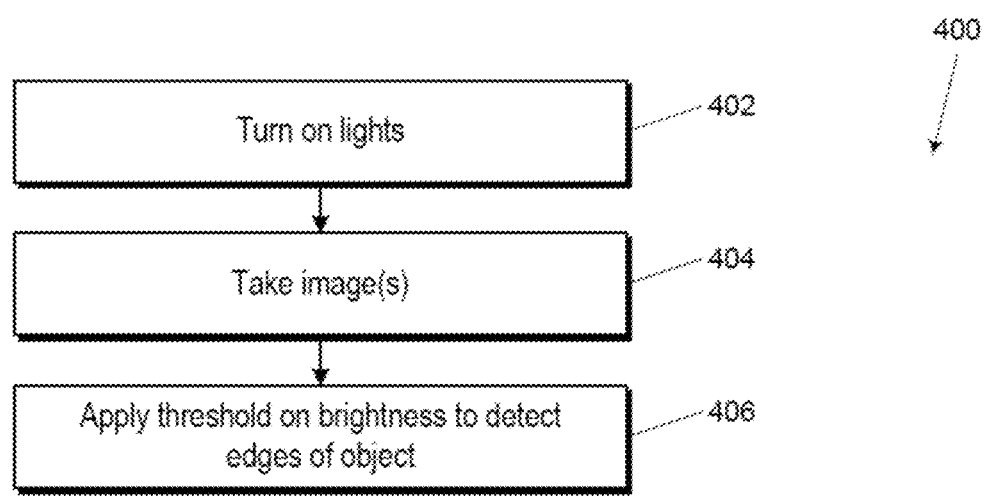
FIG. 4 is a flow diagram of a process for identifying the location of an object in an image.

FIG. 4 illustrates a process 400 for identifying the location of an object in an image. Process 400 can be implemented, e.g., in system 100 of FIG. 1. At block 402, light sources 108, 110 are turned on. At block 404, one or more images are captured using cameras 102, 104. In some embodiments, one image from each camera is captured. In other embodiments, a sequence of images is captured from each camera. The images from the two cameras can be closely correlated in time (e.g., simultaneous to within a few milliseconds) so that correlated images from the two cameras can be used to determine the 3D location of the object.

At block 406, a threshold pixel brightness is applied to distinguish object pixels from background pixels. Block 406 can also include identifying locations of edges of the object based on transition points between background and object pixels. In some embodiments, each pixel is first classified as either object or background based on whether it exceeds the threshold brightness cutoff, following noise reduction as outlined above.

In other embodiments, edges can be detected without first classifying pixels as object or background. For example, $\Delta\beta$ can be defined as the difference in brightness between adjacent pixels, and $|\Delta\beta|$ above a threshold (e.g., 0.3 or 0.5 in terms of the saturation scale) can indicate a transition from background to object or from object to background between adjacent pixels. (The sign of $\Delta\beta$ can indicate the direction of the transition.) In some instances where the object's edge is actually in the middle of a pixel, there may be a pixel with an intermediate value at the boundary. This can be detected, e.g., by computing two brightness values for a pixel i: $\beta L=(\beta i+\beta i-1)/2$ and $\beta R=(\beta i+\beta i+1)/2$, where pixel (i−1) is to the left of pixel i and pixel (i+1) is to the right of pixel i. If pixel i is not near an edge, $|\beta L-\beta R|$ will generally be close to zero; if pixel is near an edge, then $|\beta L-\beta R|$ will be closer to 1, and a threshold on $|\beta L-\beta R|$ can be used to detect edges.

In some instances, one part of an object may partially occlude another in an image; for example, in the case of a hand, a finger may partly occlude the palm or another finger. Occlusion edges that occur where one part of the object partially occludes another can also be detected based on smaller but distinct changes in brightness once background pixels have been eliminated.

Detected edges can be used for numerous purposes. For example, as previously noted, the edges of the object as viewed by the two cameras can be used to determine an approximate location of the object in 3D space. The position of the object in a 2D plane transverse to the optical axis of the camera can be determined from a single image, and the offset (parallax) between the positions of the object in time correlated images from two different cameras can be used to determine the distance to the object if the spacing between the cameras is known.

Further, the position and shape of the object can be determined based on the locations of its edges in time correlated images from two different cameras, and motion (including articulation) of the object can be determined from analysis of successive pairs of images. Examples of techniques that can be used to determine an object's position, shape and motion based on locations of edges of the object are described in co pending U.S. Ser. No. 13/414,485, filed Mar. 7, 2012, the entire disclosure of which is incorporated herein by reference. Those skilled in the art with access to the present disclosure will recognize that other techniques for determining position, shape and motion of an object based on information about the location of edges of the object can also be used. Examples of computer systems, tablets, goggles, and games incorporating a motion detector as a user input device are described in co pending U.S. Ser. No. 61/676,104, filed Jul. 26, 2012, the entire disclosure of which is incorporated herein by reference. The computer system can utilize the architecture shown in FIG. 1. For example, suitable cameras can provide image data to a desktop box, and image analysis and subsequent interpretation can be performed using the processors and other components housed therein. Alternatively, a motion-detector unit can incorporate processors or other components to perform some or all stages of image analysis and interpretation. For example, a motion-detector unit can include a processor (programmable or fixed function) that implements a process to distinguish between object pixels and background pixels.

Thus, although the technology disclosed has been described with respect to specific embodiments, it will be appreciated that the technology disclosed is intended to cover all modifications and equivalents within the scope of the following claims.

Particular Implementations

In one implementation, an image capture and analysis system is described that includes: a camera oriented toward a field of view, the camera including an image sensor having an array of pixels arranged in a plurality of parallel lines; a plurality of individually controllable, lighting elements directed toward the field of view; and a control system coupled to the image sensor and the light sources. Optionally, the lighting elements can be narrowband, such as infrared LEDs. The control system of this implementation is configured to: operate the camera to capture a sequence of images including an object moving in the field of view; and sequentially activate the lighting elements for an activation time interval to illuminate at least a portion of the field of view and deactivate the lighting elements for a deactivation time interval following the activation time interval. The control system is further configured to: operate the image sensor in an interlaced fashion to read out values of pixels in a first set of lines exposed during the activation time interval and thereafter to read out values of pixels in a second set of lines exposed during the deactivation time interval, the first set of lines being different from the second set of lines; and based on the pixel values from the first and second sets of lines, reducing noise in an image comprising or consisting of the second set of lines.

In this implementation, the actions of operating the camera to capture images, sequentially activating the lighting elements, operating the sensor in an interlaced fashion, and reducing noise are repeated to produce a plurality of noise-reduced image. The control system uses the noise reduced images to detect motion of the object.

This system and other implementations of the technology disclosed include one or more the following features and/or features described in connection with additional methods disclosed. In the interest of conciseness, the combinations of features disclosed in this application are not individually enumerated and are not repeated with each bases set of features. Features identified in the section can readily be combined with sets of base features discussed throughout this application.

The system may include a system controller and an image-sensor controller.

Noise can be removed in a variety of ways that are identified above, including subtraction, thresholding and based on ratios of pixel values between the first and second sets of lines.

Electronic shutters for the first and second sets of lines can be arranged in a variety ways. In some implementations, pixels of the sensor respond to light during the activation and deactivation time intervals. In other implementations, the first set of lines responds to light during the activation time interval and the second set of lines responds to light during the deactivation time interval.

Another system implementation describes an image capture and analysis system. The system includes: a camera including an image sensor and a field of view, wherein the image sensor operates in an interlaced mode that alternately reads out sets of odd lines and even lines of pixels arranged in adjoining rows or columns; one or more light sources directed toward the field of view; and at least one processor that generates control signals to coordinate activated and deactivated intervals of the light sources with the interlaced mode read out of the image sensor. In the system, the control signals initiate the interlaced mode readout so that a successive pair of reads from the sets of the odd and even lines capture a non-illuminated image from a deactivated interval and an illuminated image from an activated interval. The processor further compares adjoining lines from the non-illuminated image with lines from one or more illuminated images and uses the comparison to modify the illuminated image to remove noise, whereby the signal-to-noise ratio between foreground object illumination and background object illumination or background lighting improves.

The system features described above can be combined with this implementation.

In some implementations, the processor further detects motion of a foreground object from successive images after the noise removal.

Noise can be removed in any of the ways described above.

Electronic shutters for the odd and even pixels can be arranged in any of the ways described above.

In some systems, the image sensor is a charge-coupled device (CCD) sensor.

Another implementation describes a method counterpart of the system above, a method of image capture and analysis. This method can use a camera and a plurality of individually controllable, lighting elements oriented toward a field of view. The camera includes an image sensor having an array of pixels arranged in a plurality of parallel lines. The lighting elements optionally can be narrowband, such as infrared LEDs. This method includes: operating the camera to capture a sequence of images including an object moving in the field of view; and sequentially activating the lighting elements for an activation time interval to illuminate at least a portion of the field of view and deactivating the lighting elements for a deactivation time interval following the activation time interval. The method further includes operating the image sensor in an interlaced fashion to read out values of pixels in a first set of lines exposed during the activation time interval and thereafter reading out values of pixels in a second set of lines exposed during the deactivation time interval, the first set of lines being different from the second set of lines. Based on the pixel values from the first and second sets of lines, reducing noise in an image comprising or consisting of the second set of lines; and repeating capture through noise reduction actions to produce a plurality of noise-reduced images.

In some implementations, the method further includes detecting motion of the object in the noise-reduced images.

As above, noise can be removed by subtraction, thresholding, or based on ratios of pixel values between the first and second sets of lines.

Also as above, electronic shutters for this first and second sets of lines for the range and variety of ways. In some implementations pixels of the sensor respond to light during the activation and deactivation time intervals. In other implementations, only the first set of lines responds to light during the activation time interval and only the second set of lines responds to light during the deactivation time interval.

Another method implementation describes a method of image capture and analysis using an image sensor in a camera having a field of view, the image sensor operating in an interlaced mode that alternately reads out sets of odd lines and even lines of pixels arranged in adjoining rows or columns. The method includes at least one processor generating control signals to coordinate activated and deactivated intervals of one or more light sources directed to the field of view with the interlaced mode read out of the image sensor. The control signals initiating an interlaced mode readout from the image sensor so that a successive pair of reads from the sets of the odd and even lines capture a non-illuminated image from an deactivated interval and an illuminated image from an activated interval. The method further includes comparing lines from the non-illuminated image with lines from one or more illuminated images and using comparison to modify the illuminated image to remove noise.

Method features applied to any of the methods described above also can be applied to this method.

Other implementations include non-transitory computer readable storage medium storing instructions executable by a processor to perform any of the methods described above. Another implementation includes non-transitory computer readable storage medium storing instructions executable while via processor that when combined with suitable hardware produce any of the systems or devices described herein.

While the technology disclosed is disclosed by reference to the examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An image capture and analysis system including:
   a camera including an image sensor and a field of view, wherein the image sensor operates in an interlaced mode that alternately reads out sets of odd lines and even lines of pixels arranged in adjoining rows or columns;
   one or more light sources directed toward the field of view with existing ambient illumination; and
   at least one processor that generates control signals to coordinate activated and deactivated intervals of the light sources with the interlaced mode read out of the image sensor;
   wherein the control signals initiate the interlaced mode readout so that a successive pair of reads from the sets of the odd and even lines capture a non-illuminated image from a deactivated interval and an illuminated image from an activated interval;
   wherein the non-illuminated image from the deactivated interval is illuminated by the existing ambient illumination;

wherein the processor further compares adjoining lines from the non-illuminated image with lines from one or more illuminated images and uses the comparison to modify the illuminated image to remove noise based on ratios of pixel values between the pixel values in illuminated and non-illuminated images, whereby signal-to-noise ratio between foreground object illumination and background object illumination or background lighting improves.

2. The system of claim 1, wherein the processor further detects motion of a foreground object from successive images after noise removal.

3. The system of claim 1, wherein the noise is removed by subtraction.

4. The system of claim 1, wherein the noise is removed by thresholding.

5. The system of claim 1, wherein all pixels of the image sensor respond to light during activation and deactivation time intervals.

6. The system of claim 1, wherein only pixels in the set of odd lines respond to light during activation time intervals and only pixels in the set of even lines respond to light during deactivation time intervals.

7. The system of claim 1, wherein the image sensor is a charge-coupled device (CCD) sensor.

8. A method of image capture and analysis using an image sensor in a camera having a field of view with existing ambient illumination, the image sensor operating in an interlaced mode that alternately reads out sets of odd lines and even lines of pixels arranged in adjoining rows or columns, the method including:

at least one processor generating control signals to coordinate activated and deactivated intervals of one or more light sources directed to the field of view with the interlaced mode read out of the image sensor;

the control signals initiating an interlaced mode readout from the image sensor so that a successive pair of reads from the sets of the odd and even lines capture a non-illuminated image from a deactivated interval and an illuminated image from an activated interval;

wherein the non-illuminated image from the deactivated interval is illuminated by the existing ambient illumination; and comparing lines from the non-illuminated image with lines from one or more illuminated images and using comparison to modify the illuminated image to remove noise based on ratios of pixel values between the pixel values in illuminated and non-illuminated images.

9. The method claim 8, further including detecting motion of a foreground object from successive images after noise removal.

10. The method of claim 8, further including removing the noise by subtraction.

11. The method of claim 8, further including removing the noise by thresholding.

12. The method of claim 8, wherein all pixels of the image sensor respond to light during activation and deactivation time intervals.

13. The method of claim 8, wherein only pixels in the set odd of lines respond to light during activation time intervals and only pixels in the set of even lines respond to light during deactivation time intervals.

14. The method of claim 8, wherein the image sensor is a charge-coupled device (CCD) sensor.

* * * * *